United States Patent [19]
Galipeau et al.

[11] Patent Number: 5,786,972
[45] Date of Patent: Jul. 28, 1998

[54] TEMPERATURE-COMPENSATED VOLTAGE CLAMP WITH FORCED PASS TRANSISTOR VOLTAGE SHARING

[75] Inventors: Denis P. Galipeau, Woonsocket; Jon A. Rhan, Coventry, both of R.I.

[73] Assignee: Cherry Semiconductor Corporation, East Greenwich, R.I.

[21] Appl. No.: 664,236

[22] Filed: Jun. 7, 1996

Related U.S. Application Data

[60] Provisional application No. 60/000,016 Jun. 8, 1995.
[51] Int. Cl.⁶ .................................................. H02H 9/00
[52] U.S. Cl. .......................... 361/56; 361/58; 361/111; 361/115
[58] Field of Search .................... 361/56, 58, 93, 361/115, 118, 111, 127

[56] References Cited

U.S. PATENT DOCUMENTS

| | | | |
|---|---|---|---|
| 4,258,311 | 3/1981 | Tokuda | 323/313 |
| 5,173,755 | 12/1992 | Co et al. | 257/361 |

Primary Examiner—Jeffrey A. Gaffin
Assistant Examiner—Stephen Jackson
Attorney, Agent, or Firm—Bromberg & Sunstein LLP

[57] ABSTRACT

A voltage clamp for protecting a load from transients in a supply line comprising pass transistors coupled to a bias circuit path. The bias circuit path determines the clamp turn-on voltage of the voltage clamp and comprises transistors configured as zener diodes and transistors configured as forward biased pn junctions. The pass transistors are coupled to the bias path so as to conduct current from the supply line to ground when the voltage drop across the bias circuit path reaches the clamp turn-on voltage. The collector-to-emitter voltage drops of the pass transistors during current conduction are equal to one another and sum up to the clamp turn-on voltage, and therefore, the pass transistors advantageously share equally the clamp turn-on voltage drop across their collector-to-emitter junctions. The bias circuit path is temperature compensated so that the clamp turn-on voltage is substantially independent of temperature. Additional bipolar transistors are coupled between the pass transistors and bias circuit path to supply bias current to the pass transistors so that negligible current is drawn from the bias path when the pass transistors are conducting current.

27 Claims, 4 Drawing Sheets

TEMPERATURE-COMPENSATED VOLTAGE CLAMP WITH FORCED PASS TRANSISTOR VOLTAGE SHARING

This application claims the benefit of U.S. Provisional application Ser. No. 60/000,016, filed Jun. 8, 1995.

BACKGROUND OF THE INVENTION

This invention is directed to the protection of integrated circuits from voltage transients, and in particular, to the protection of automotive circuits from damage due to battery load-dump transients. Such transients occur on the lines connected to a power supply or battery, and in the case of automotive electronics, can reach peak voltages greater than 70 volts. Transistors exposed to such transients often exceed their maximum rated collector-to-emitter voltage and break down. Once a transistor breaks down, large amounts of current can flow through it, causing excessive heating and damage. This damage is prevented by placing a resistor in series between the power supply or battery and the circuit to be protected, and placing a voltage clamp of some type in parallel with the circuit. The clamp protects the circuit from over-voltage conditions and the resistor limits the amount of current flowing through the clamp.

Prior-art voltage clamps comprise a zener diode or a string of zener diodes placed in parallel with the circuit to be protected. In such a configuration, the clamp turn-on voltage is the sum of zener breakdown voltages comprising the clamp. Once the clamp turn-on voltage is reached, the zener diode or diodes begin to conduct, resulting in the voltage being clamped to approximately the clamp turn-on voltage.

However, the zener breakdown voltage depends upon current and temperature. Therefore, as current through a prior-art clamp increases, the clamp voltage will increase as a direct result of the current increase, and the clamp voltage will also increase due to the power dissipation raising the diodes' junction temperature.

SUMMARY OF THE INVENTION

The present invention is directed to a clamp in which the clamp turn-on voltage is temperature compensated and is substantially independent of the current passing through the clamp.

One embodiment of the invention employs a plurality of zener diodes, or transistors configured as zener diodes, along with a plurality of forward biased diodes to thermally compensate the clamp turn-on voltage, and a configuration of transistors and pass transistors to conduct most of the current when the clamp turn-on voltage is exceeded.

The present invention further provides a clamping action in which the majority of current flow, once the clamping turn-on voltage is reached, is through pass transistors designed for large current conduction, preferably bipolar npn, rather than through zener diodes, thereby preventing the clamp turn-on voltage from being dependent upon the current passing through the clamp.

The clamp of the present invention has a clamp turn-on voltage which is advantageously temperature compensated and is substantially independent of the current passing through the clamp. Another advantage of the present invention is to provide clamping action in which the clamp turn-on voltage drop is shared among a plurality of pass transistors so that the maximum rated collector-to-emitter voltage of each pass transistor is not exceeded.

DETAILED DESCRIPTION OF THE PREFERRED EMBODIMENTS

Figure 1:
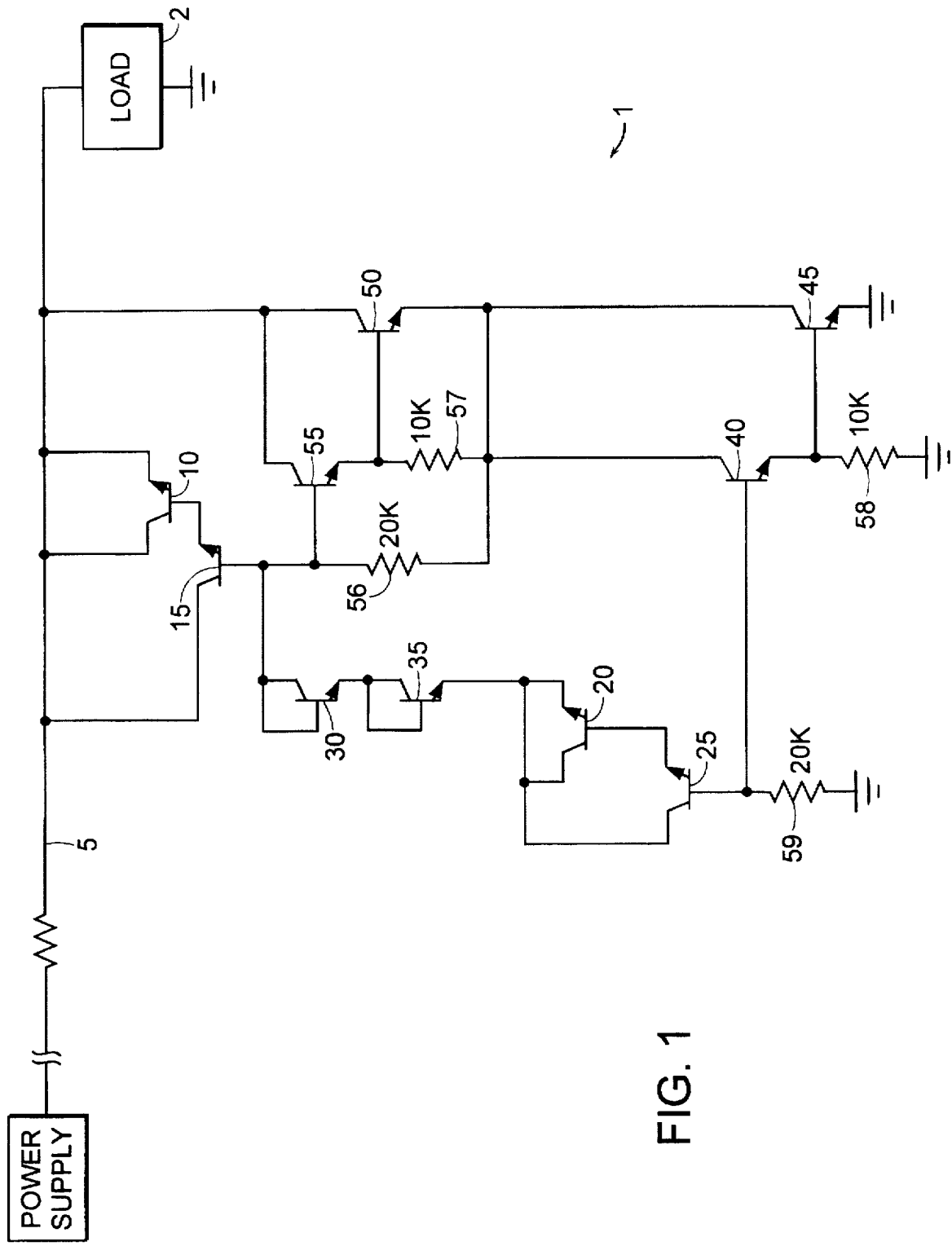
FIG. 1 is a schematic diagram of an embodiment of the invention with two pass transistors in which the collector-to-emitter voltage of each pass transistor is one-half the clamp turn-on voltage during the clamping action.

FIG. 1 illustrates voltage clamp 1 used to protect load 2 from transients in power supply line or conductor 5. In the embodiment presented in FIG. 1, transistors 10, 15, 20, and 25 are configured as base-emitter zener diodes. Each of these base-emitter zener diodes conduct when a particular base-to-emitter voltage is reached, which we denote as $V_Z$. Transistors 30 and 35 are configured as base-emitter forward biased diodes, each with a forward bias voltage drop denoted as $V_{BE}$. We shall also assume that the base-emitter forward bias voltages of transistors 40, 45, 50, and 55 are each $V_{BE}$.

The clamp turn-on voltage of a voltage clamp is determined by the "bias path" of the voltage clamp. A bias path is a circuit path within the voltage clamp comprising circuit elements that clamp the voltage drop across the voltage clamp. The bias path of the embodiment in FIG. 1 is from power supply line 5 to ground via base-emitter zener diodes 10 and 15, base-emitter forward biased diodes 30 and 35, base-emitter zener diodes 20 and 25, and through the base-emitters of transistors 40 and 45. Therefore, the total voltage required at power supply line 5 for the clamp bias path to conduct, which is the clamp turn-on voltage and is denoted by $V_{CLAMP}$, is given by $$V_{CLAMP}=4V_Z+4V_{BE}.$$

We see from the above equation that when the temperature coefficients of the zener diodes are approximately equal in magnitude and opposite in sign to that of the forward biased base-emitter diodes and the forward biased base-emitters of transistors 40 and 45, the clamp turn-on voltage is nearly temperature-invariant.

Pass transistors 50 and 45 carry the majority of the current in the voltage clamp once the clamp turn-on voltage is exceeded. These transistors have their base currents provided by transistors 55 and 40, respectively, which in turn have their base currents provided by the zener diodes and forward biased diodes. This configuration allows the zener diodes and forward biased diodes to cause the pass transistors to go into current conduction with a relatively small amount of current, thereby reducing any errors in the clamp turn-on voltage which depend upon current flow through the zener diodes and forward biased diodes.

Resistors 56, 57, 58, and 59 provide base-to-emitter current paths for transistors 55, 50,45, and 40 so that when the voltage clamp is supposed to be OFF, the base-to-emitter voltages will be kept below the cut-in voltage, for otherwise, in a hot environment such as the engine compartment of an automobile, thermally generated hole-electron pairs may cause the transistors to turn ON. In the embodiment of FIG. 1, the values of the resistors are chosen so that the current drawn through transistors 10, 15, 30, 35, 20, and 25 is on the order of 0.1 ma or less.

In many cases, particularly in automotive electronics, a load dump transient peak voltage is sufficiently large enough to exceed the collector-to-emitter breakdown voltage of any one transistor. However, in the embodiment shown in FIG. 1, as well as in other embodiments to be discussed shortly, transistors 50 and 45 are forced to share the total clamp voltage drop equally, i.e., the turn-on clamp voltage, such that each has a collector-to-emitter voltage equal to one-half of the total clamp voltage drop. This is easily seen by noting that the collector of transistor 50 is coupled to power supply line 5. A voltage drop of $2V_Z$ exists between the collector of transistor 50 and the base of transistor 55 when the clamp is active. A further drop of $2V_{BE}$ exists from the base of transistor 55 to the emitter of transistor 50. Thus, the collector-to-emitter voltage of transistor 50 is clamped to $2V_Z+2V_{BE}$, or one-half of the total clamp voltage. Transistor 45 is clamped to $V_{CLAMP}$ minus the collector-to-emitter voltage of transistor 50, which is $2V_Z+2V_{BE}$. Thus, both transistors 45 and 50 share the total clamp voltage drop equally.

It should be clear to one of ordinary skill in electronics that the embodiment illustrated in FIG. 1 can be modified by adding additional pass transistors and or base-emitter zener diodes and base-emitter forward biased diodes, so that the clamp turn-on voltage can be increased and more pass transistors can share the total clamp voltage drop. Thus, voltage clamps with higher turn-on voltages can be built without the need to select pass transistors with higher collector-to-emitter breakdown voltages.

Also, the embodiment of FIG. 1 can be modified without departing from the scope and spirit of the invention by substituting for transistors 10 and 15, as well as transistors 20 and 25, any type of zener diode clamp, and substituting for transistors 30 and 35 any type of forward biased diode clamp.

Typical values for the resistors used in the clamp of FIG. 1 are given in the figure. These are representative values, however, and other values may be used.

Figure 2:
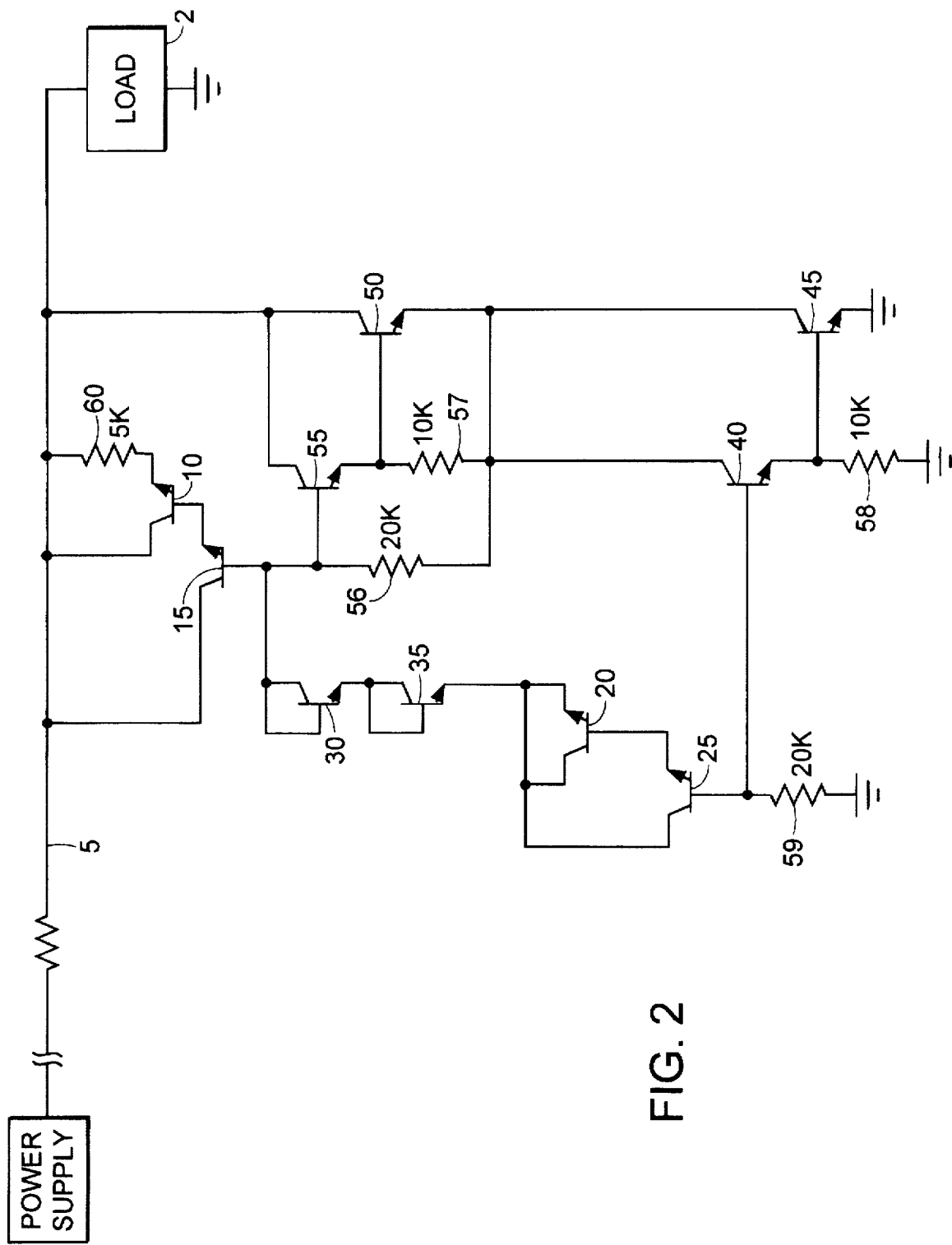
FIG. 2 is a schematic diagram of a modification of the embodiment of FIG. 1 in which a resistor has been added to modify the clamp turn-on voltage.

Another embodiment of the present invention is illustrated in FIG. 2, where components with corresponding components in FIG. 1 are referenced with the same numerals. The embodiment of FIG. 2 is identical to that of FIG. 1 except that resistor 60 has been added between power supply line 5 and the emitter of transistor 10.

Resistor 60 provides a voltage drop which, in conjunction with resistors 59 and 56, may be used to further temperature-compensate the clamp turn-on voltage in the event that the magnitude of the change in $V_Z$ due to temperature change is not equal to that of $V_{BE}$. By noting that the voltage drops across resistors 59 and 56 are both equal to $2V_{BE}$ and that the sum of currents through these resistors is nearly equal to the current through resistor 60, the turn-on voltage of the embodiment in FIG. 2 is seen to be given approximately by $$V_{CLAMP}=4V_Z+4V_{BE}+R1[2V_{BE}/R2+2V_{BE}/R3],$$

where R1, R2, and R3 denote the resistance values for resistors 60, 59, and 56, respectively. Thus, proper choice of the ratios of R1/R2 and R1/R3 can be made so that the turn-on voltage $V_{CLAMP}$ properly temperature compensated. Representative values of the resistors in FIG. 2 are provided in the figure.

Figure 3:
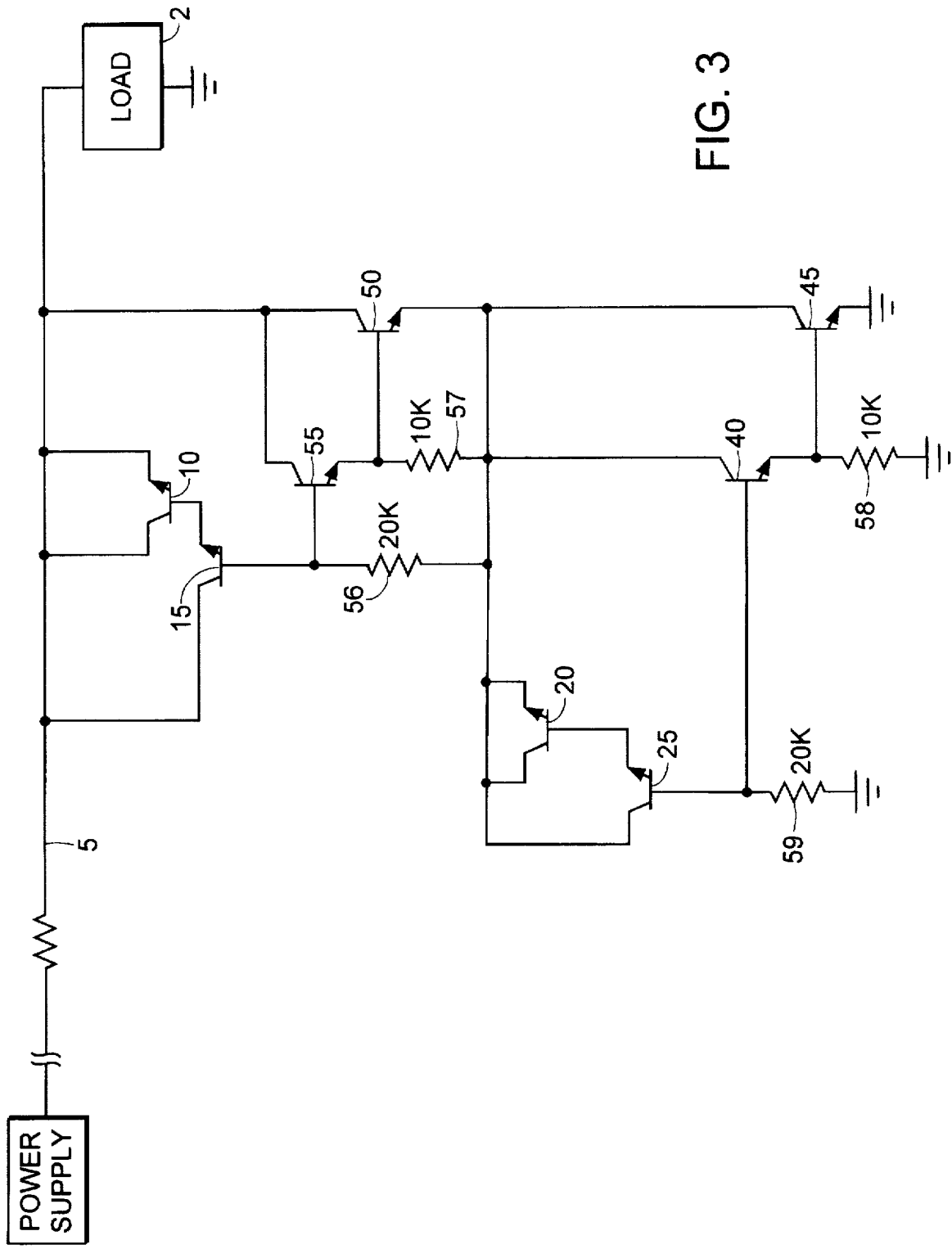
FIG. 3 is a schematic diagram of a modification of the embodiment of FIG. 1 in which the function of two forward biased base-emitter diodes illustrated in FIG. 1 is now performed by two transistors.

A third embodiment is shown in FIG. 3. Components with corresponding components in the earlier figures are labeled with the same reference numerals. This embodiment is equivalent to that of FIG. 1 except that the base-emitter forward biased diodes 30 and 35 in FIG. 1 are not present. The bias path in FIG. 3 now includes the base-to-emitter paths of transistors 55 and 50. Thus, the clamp turn-on voltage $V_{CLAMP}$ in FIG. 3 is still given by the same equation for the earlier figures. However, the embodiment of FIG. 3 allows the total clamp voltage to be more exactly shared among pass transistors 50 and 45 by matching the $V_{BE}$ of 55 and 50 with that of 40 and 45.

Figure 4:
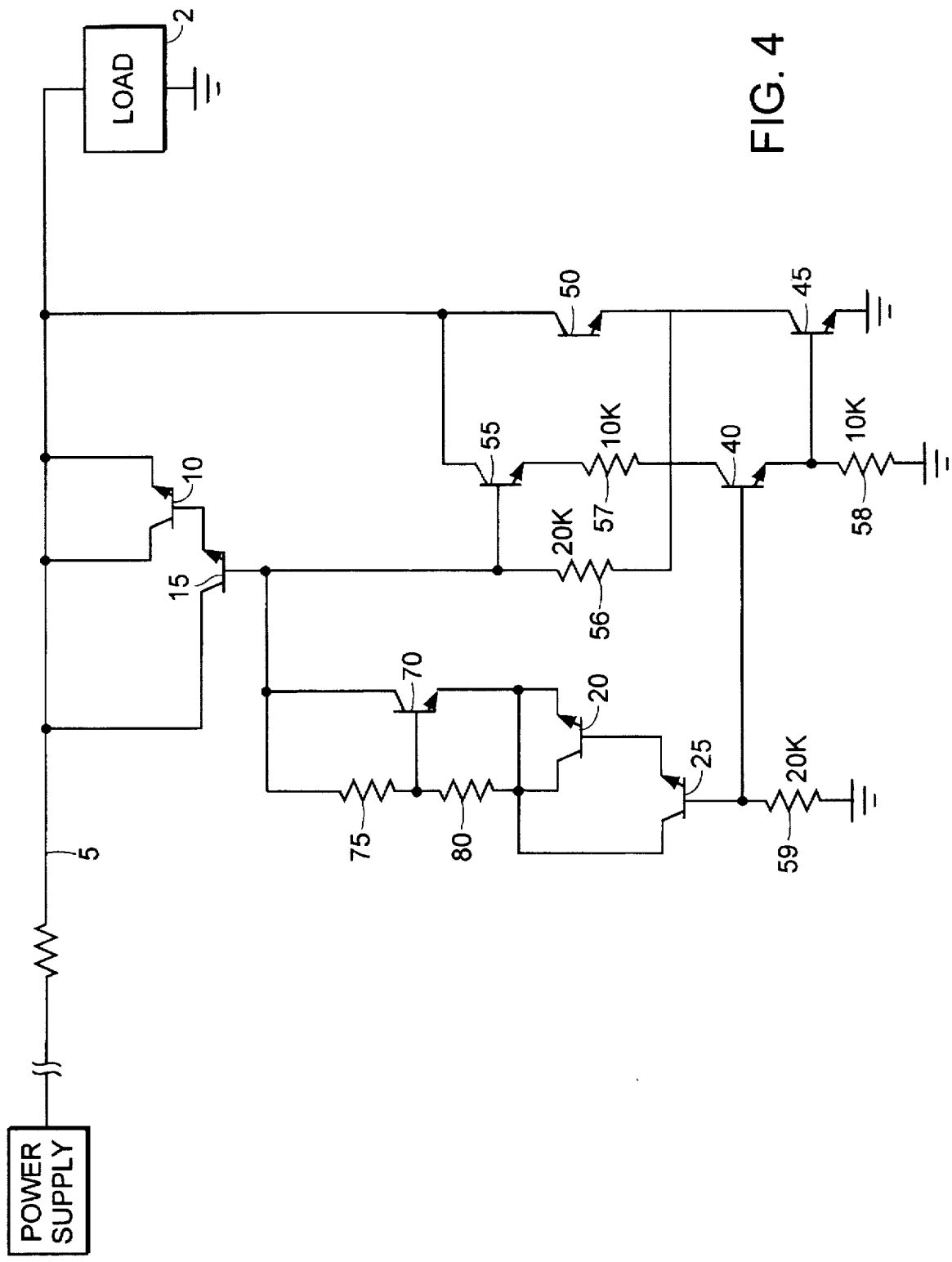
FIG. 4 is a schematic diagram of a modification of the embodiment of FIG. 1 in which the function of two forward biased base-emitter diodes illustrated in FIG. 1 is now performed by a circuit comprising resistors and a transistor.

A fourth embodiment is shown in FIG. 4 where a $V_{BE}$ multiplier circuit comprising npn transistor 70 and resistors 75 and 80 replaces transistors 30 and 35 of FIG. 1. Denoting the resistance values for resistors 75 and 80 as R3 and R4, respectively, the collector-to-emitter voltage drop of transistor 70 is approximately given by $(1+R3/R4)V_{BE}$. The voltage drop across the bias path for the embodiment of FIG. 4 includes this collector-emitter voltage drop. Thus, this $V_{BE}$ multiplier circuit may be used to provide temperature compensation of the clamp turn-on voltage in the event that the magnitude of change in $V_Z$ due to temperature change is not equal to that of $V_{BE}$.

Other modifications may be made to the embodiments of the invention presented here without departing from the scope or spirit of the present invention. For example, any means for providing a temperature compensated voltage reference similar in utility to a combination of zener diodes and forward biased diodes may be substituted for the base-emitter zener diodes and base-emitter forward biased diodes illustrated in the preceding embodiments.

Furthermore, it is not necessary that the pass transistors share the turn-on voltage equally. For example, if in FIG. 1 additional forward biased base-emitter diodes are added in series to transistors 30 and 35 and additional base-emitter zener diodes are added in series to transistors 20 and 25, then the collector-to-emitter voltage drop of pass transistor 45 is larger than that of pass transistor 50. However, in a preferred embodiment there is approximately equal sharing among the pass transistors.

We claim:

1. A voltage clamp with a first terminal and a second terminal, comprising:

a first pass transistor with collector coupled to the first terminal of the voltage clamp;

a first clamping element with a first terminal coupled to the first terminal of the voltage clamp and a second terminal coupled to the base of the first pass transistor;

a second clamping element with a first terminal coupled to the second terminal of the first clamping element and a second terminal coupled to a common node; and a second pass transistor with its collector coupled to the emitter of the first pass transistor, its emitter coupled to the common node, and its base coupled to the second terminal of the second clamping element.

2. The voltage clamp as set forth in claim 1, further comprising:

a first base current supply transistor with its collector coupled to the first terminal of the voltage clamp, its emitter coupled to the base of the first pass transistor, and its base coupled to the second terminal of the first clamping element.

3. The voltage clamp as set forth in claim 2, further comprising:

a second base current supply transistor with its collector coupled to the emitter of the first pass transistor, its emitter coupled to the base of the second pass transistor, and its base coupled to the second terminal of the second clamping element.

4. The voltage clamp as set forth in claim 3, wherein the common node is coupled to the second terminal of the voltage clamp.

5. The voltage clamp as set forth in claim 3, wherein the second clamping element comprises in series a forward biased pn junction and a zener diode clamp.

6. The voltage clamp as set forth in claim 3, wherein the first clamping element comprises a zener diode clamp.

7. The voltage clamp as set forth in claim 6, wherein the second clamping element comprises in series a forward biased pn junction and a zener diode clamp.

8. The voltage clamp as set forth in claim 7, wherein the second clamping element further comprises a $V_{BE}$ multiplier circuit.

9. A voltage clamp comprising:
- a first pass transistor having a collector, a base and an emitter;
- a first clamping element coupled between the collector and the base of said first pass transistor;
- a second clamping element connected in series between said first clamping element and ground; and
- a second pass transistor having a collector coupled to the emitter of said first pass transistor, an emitter coupled to ground and a base coupled to said second clamping element so as to receive base drive current when said voltage clamp is clamping a voltage.

10. The voltage clamp of claim 9 wherein said second clamping element comprises in series a forward biased pn junction and a zener diode clamp.

11. The voltage clamp of claim 9 wherein said second clamping element comprises a $V_{BE}$ multiplier circuit in series with a zener diode clamp.

12. The voltage clamp of claim 9 wherein each of said first and second pass transistors is a bipolar NPN transistor.

13. The voltage clamp of claim 9 further comprising a first resistor coupled between the base and the emitter of said first pass transistor and a second resistor coupled between the base and the emitter of said second pass transistor.

14. The voltage clamp of claim 9 further comprising a first base current supply transistor with its collector coupled to the collector of said first pass transistor, its emitter coupled to the base of said first pass transistor, and its base coupled to said first clamping element.

15. The voltage clamp of claim 14 further comprising a second base current supply transistor with its collector coupled to the emitter of said first pass transistor, its emitter coupled to the base of said second pass transistor, and its base coupled to said second clamping element.

16. The voltage clamp of claim 9 wherein said first clamping element comprises a zener diode clamp.

17. The voltage clamp of claim 16 wherein said second clamping element comprises in series a forward biased pn junction and a zener diode clamp.

18. The voltage clamp of claim 17 wherein the zener diode clamps of said first clamping element and said second clamping element comprise bipolar transistors.

19. A voltage clamp comprising:
- a first bipolar transistor having a collector, a base and an emitter;
- first means, coupled between the collector and the base of said first bipolar transistor, for clamping a first voltage between the collector and the base of said first bipolar transistor;
- a second bipolar transistor having a collector coupled to the emitter of said first bipolar transistor, a base and an emitter coupled to ground; and
- second means, coupled between the base of said first bipolar transistor and ground, for clamping a second voltage at the base of said first bipolar transistor such that the collector of said first bipolar transistor is clamped at the first voltage plus the second voltage.

20. The voltage clamp of claim 19 wherein said second means comprises in series a forward biased pn junction and a zener diode clamp.

21. The voltage clamp of claim 19 wherein said second means comprises a $V_{BE}$ multiplier circuit in series with a zener diode clamp.

22. The voltage clamp of claim 19 further comprising a first resistor coupled between the base and the emitter of said first bipolar transistor and a second resistor coupled between the base and the emitter of said second bipolar transistor.

23. The voltage clamp of claim 19 further comprising a first base current supply transistor with its collector coupled to the collector of said first bipolar transistor, its emitter coupled to the base of said first bipolar transistor, and its base coupled to said first means.

24. The voltage clamp of claim 23 further comprising a second base current supply transistor with its collector coupled to the emitter of said first bipolar transistor, its emitter coupled to the base of said second bipolar transistor, and its base coupled to said second means.

25. The voltage clamp of claim 19 wherein said first means comprises a zener diode clamp.

26. The voltage clamp of claim 25 wherein said second means comprises in series a forward biased pn junction and a zener diode clamp.

27. The voltage clamp of claim 26 wherein the zener diode clamps of said first means and said second means comprise a plurality of bipolar transistors.

* * * * *